United States Patent [19]
Hicks

[11] Patent Number: 6,104,096
[45] Date of Patent: Aug. 15, 2000

[54] ELECTRICITY GENERATION FOR PEDALLED VEHICLES

[75] Inventor: Richard Banfield Hicks, Kingston, United Kingdom

[73] Assignee: Pedalite Limited, United Kingdom

[21] Appl. No.: 09/241,511

[22] Filed: Feb. 1, 1999

[30] Foreign Application Priority Data

Feb. 2, 1998 [GB] United Kingdom ............... 9802026

[51] Int. Cl.[7] ............................ H02P 9/00; B60Q 1/00
[52] U.S. Cl. .......................... 290/1 R; 322/1; 180/205; 362/72
[58] Field of Search .................... 290/1 R, 1 C, 290/3; 322/1; 180/205; 362/72, 78

[56] References Cited

U.S. PATENT DOCUMENTS

| Re. 30,758 | 10/1981 | Lang | 474/80 |
|---|---|---|---|
| 3,589,193 | 6/1971 | Thornton | 73/379 R |
| 4,036,068 | 7/1977 | Gilbert | 74/230.17 |
| 4,249,750 | 2/1981 | Kantner | 280/216 |
| 4,822,032 | 4/1989 | Whitmore et al. | 272/73 |
| 4,946,425 | 8/1990 | Buhlmann | 474/80 |
| 5,078,416 | 1/1992 | Keyes | 280/260 |
| 5,634,707 | 6/1997 | Bailey, Jr. | 362/78 |
| 5,662,187 | 9/1997 | Mc Govern | 180/205 |
| 5,662,405 | 9/1997 | Kuo | 362/72 |
| 5,833,348 | 11/1998 | Bailey, Jr. | 362/72 |

FOREIGN PATENT DOCUMENTS 7-291174  11/1995  Japan .

*Primary Examiner*—Nicholas Ponomarenko
*Attorney, Agent, or Firm*—Quarles & Brady LLP

[57] ABSTRACT

A generator mounted within the tread portion of a pedal of a bicycle or the like is driven via pulleys of unequal diameter and a gear box so that the speed of rotation of the rotor of the generator is a multiple of the speed of relative rotation between the spindle of the pedal and the tread portion when the latter is held horizontal by a foot resting on it and the crank from which the spindle extends is rotated to propel the bicycle. The gearing up of the generator enables sufficient output voltage to illuminate an array of LEDs and charge a capacitor which will keep them illuminated while the pedal is temporarily stationary.

25 Claims, 1 Drawing Sheet

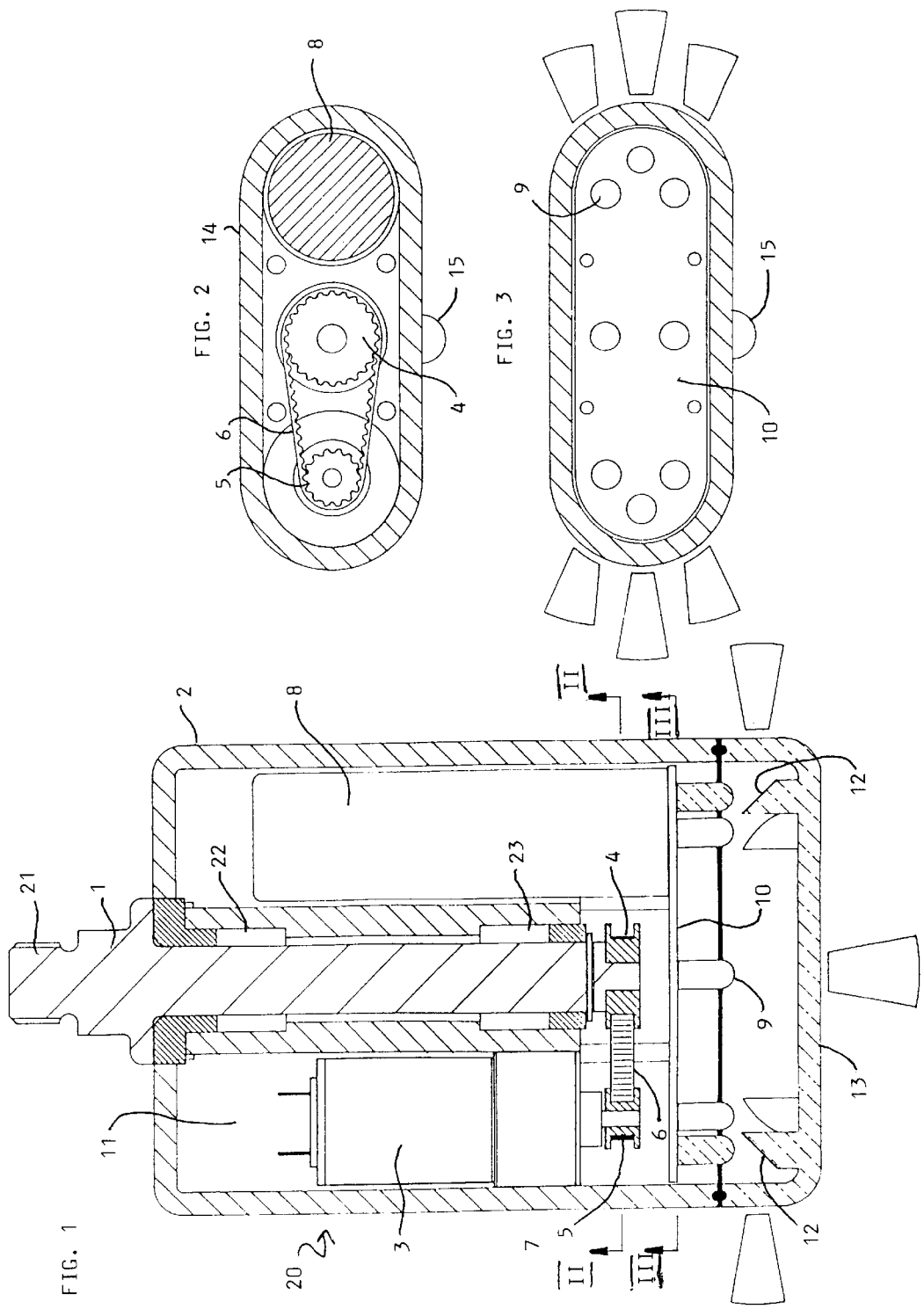

ELECTRICITY GENERATION FOR PEDALLED VEHICLES

BACKGROUND OF THE INVENTION

1. Field of the Invention

This invention relates to electricity generation for pedalled vehicles and more particularly to improvements in the generation of electricity by pedal power and its use in contributing to road safety.

2. Description of the Prior Art

Pedalled vehicles such as bicycles are particularly vulnerable to road accidents not only because they offer little or no protection to the rider but primarily because the drivers of other vehicles may not see them, especially in the dark or poor weather conditions. It is of course mandatory in most countries for bicycles to use lights in the dark and most are equipped with reflectors, but conventional lighting systems leave much to be desired. If lighting is by dry batteries these may fail or the rider may simply fail to turn them on. The drawbacks of conventional generators, either incorporated in a wheel hub or driven by a tyre, include the fact that they make pedalling harder, which is a disincentive to using them, and that the illumination they provide ceases as soon as the bicycle stops, representing a considerable danger e.g. when the bicycle is waiting at traffic lights or at a road junction. Reflectors are of course only effective when illuminated by the oncoming vehicle, which will not occur if the latter has no adequate lights or is approaching at an angle.

In recent years LEDs (light emitting diodes) have been used either instead of or to supplement light bulbs. Taking advantage of their relatively low power consumption it is practicable to have them permanently in use, even in daylight. Flashing LEDs attract attention and it has been appreciated that it is particularly advantageous to mount them upon the pedals. Their rotary motion attracts attention and moreover an oncoming driver can judge his orientation relative to the bicycle by whether the rotating LEDs describe a circle (when at right angles) a vertical line (when in front or behind) or an elipse when approaching at an angle. Direction can of course be judged by the colour of the visible LEDs, usually red indicating the rear of the bicycle and a white or green light indicating that it is approaching.

While the use of LEDs on the pedals of a bicycle is highly advantageous, if their power is derived from a dry battery this may fail unbeknownst to the rider and in any event the use of dry batteries is undesirable if it can be avoided both because of their high cost and the environmental problems associated with their disposal.

Japanese Patent Publication No. 07291174A and U.S. Pat. No. 5,662,405 propose the modification of a bicycle pedal to serve as a generator of electricity to illuminate LEDs mounted on the frame or tread portion of the pedal. Permanent magnets are attached to the pedal shaft or spindle and the pedal frame or tread portion is provided with windings or solenoids and relative rotation between the permanent magnets and the windings as relative rotation occurs between the pedal spindle and tread portion generates current by magnetic induction on the same principles as in the case of a conventional bicycle dynamo.

The voltage generated by an inductance generator is a function of the number of windings of the stator and the speed of rotation of the rotor. The essential weakness of a system such as described in the said Japanese patent publication resides in the relatively very low speed of rotation of the rotor or spindle under normal circumstances. A pedal spindle will rotate only once relative to the tread portion or frame mounted upon it for every revolution of the crank on which the spindle is mounted. A cyclist typically will pedal at between 30 and 60 revolutions of the pedal crank per minute. Japanese Patent publication No. 07291174A recognises this problem but the only solution proposed is to increase the number of windings. The present Applicants have calculated that this is impracticable because it would increase unacceptably the cost and/or size of the stator component, bearing in mind that this is to be incorporated in the tread portion of a pedal.

Another disadvantage of using the pedal spindle itself as the rotor is that it, and the associated bearings, will be subjected to the wear and abuse in service which pedal spindles usually experience. It is preferable that the relatively delicate and accurate bearings of a generator should not be directly exposed to such treatment.

SUMMARY OF THE INVENTION

A principal object of the present invention is to improve upon the proposals of the said Japanese Patent publication and offer solutions to the problems associated therewith.

In accordance with the invention there is provided electricity generating apparatus for a vehicle equipped with pedals, such as a bicycle, wherein at least one said pedal comprises a spindle and a tread portion relatively rotatable about the spindle, electricity generating means mounted upon the tread portion and transmission means between the spindle and generator such that for each revolution of the spindle relative to the tread portion the generator undergoes more than one revolution.

Preferably the rotor of the generator is rotatably mounted within the tread portion to rotate about an axis generally parallel with that of the spindle and the generator preferably comprises stator means generally parallel with the spindle and stationary relative to the tread portion.

The transmission means may drive the rotor of the generator via gears at one end of the generator stator.

The transmission means may comprise meshing gear wheels of unequal diameter one of which is stationary relative to the spindle and the other of which drives the rotor of the generator or it may comprise pulleys of unequal diameter one of which is stationary relative to the spindle and the other of which drives the rotor of the generator, said pulleys being connected by an endless belt. The ratio of said gear wheels or of said pulleys is preferably of the order of 2:1.

The said gears are preferably included in a gear box which has a 5:1 output ratio.

The generator and gear box may be arranged in longitudinal alignment within the tread portion on one side of the spindle and a capacitor may be arranged within the tread portion on the opposite side of the spindle, the capacitor being arranged to store electricity generated by the generator.

One or more arrays of LEDs may be mounted on the tread portion and arranged to be energised by electricity generated by the generator. LEDs exposed to view at one side of the tread portion may differ from LEDs exposed at the opposite side of the tread portion and the weight of the tread portion may be different on opposite sides of the spindle such that it adopts a non-horizontal attitude before a foot is placed upon it. Alternatively, or in addition, the underside of the tread portion may have an outward projection. In this way a cyclist can determine whether a pedal tread portion is the right way round or not (i.e. to offer the correct LED displays in the correct directions) when putting a foot on it. The said difference between the LEDs may be one of colour, number, distribution or any combination of these.

The arrangement is preferably such that the generator has an output of approximately 2 volts when relative rotation between the spindle and tread portion is 30 rpm.

BRIEF DESCRIPTION OF THE DRAWINGS

A preferred embodiment of the invention will now be described with reference to the accompanying Drawings, in which:

FIG. 1 is a longitudinal section through a bicycle pedal assembly in accordance with the present invention, FIG. 2 is a sectional elevation taken on the line II—II of FIG. 1, and FIG. 3 is a sectional elevation taken on the line III—III of FIG. 1.

DETAILED DESCRIPTION OF THE PREFERRED EMBODIMENT

The bicycle pedal 20 illustrated in FIG. 1 is designed to extend at one end 21 from a crank (not shown) of a bicycle. As is well known per se the bicycle has a second crank similarly equipped with a pedal at 180° to the first, and by placing one foot on each pedal and rotating the cranks the cyclist propels the machine. The pedal comprises a shaft or spindle 1 which will be stationary relative to the associated crank and upon which is mounted a frame or tread portion 2 to be relatively rotatable by means of bearings 22 and 23. With a cyclists' foot resting on it the tread portion 2 will be held in a horizontal attitude and so for each full revolution of the crank there is one full revolution of the spindle 1 relative to tread portion 2. As so far described the pedal 20 is conventional so that no further description is considered necessary.

In accordance with the present invention, however, there is disposed at the distal end of the spindle 1 and stationary with respect thereto a pulley 4 which is connected by an endless belt 6 to a smaller pulley 5 with a ratio of 2:1. The pulley 5 is at one end of and drives the gears of a gear box 7 which in turn drives the rotor of a generator 3, the gear box having the effect that the rotor of the generator 3 is rotated at five times the speed of the pulley 5. The assembly of gear box 7 and generator 3 is a proprietary product readily available on the market so that no further description thereof is considered necessary. It is housed within the tread 2 on one side of the spindle 1. Housed in the tread 2 on the opposite side of the spindle is a capacitor 8 which is arranged to store electricity generated by the generator 3 so as to continue to energise an array 9 of LEDs, if for only a short time, after the generator ceases to rotate either because the bicycle is stationary or because the cyclist is freewheeling.

It will be seen that by this arrangement for each full rotation of the crank, and with the tread 2 held horizontal by a foot placed upon its upper surface 14, there will be one full revolution of the pulley 4 relative to the tread 2 and in consequence the rotor of the generator will be rotated at a speed which is a multiple of the speed of rotation of the crank, typically 300 rpm when the rate of rotation of the crank is between 30 and 60 rpm. A speed of rotation of the rotor of the generator of 300 rpm is sufficient to output 2 volts or more, this being the minimum required simultaneously to energise the LEDs 9 and charge the capacitor 8.

The array 9 of LEDs mounted on a circuit board 10 is housed in a lens 13 at the distal end of the pedal tread portion 2 and mirrored surfaces 12 within the lens are arranged to project light beams in the fore and aft direction Where there is no mirrored surface opposite an LED its light beam is projected laterally outwardly of the bicycle.

In a modification which is not illustrated the mountings of the mirrored surfaces 12 instead of being integral with the material of the lens are free to rotate relative thereto and are eccentrically weighted so that the respective mirrored surface will maintain the same attitude irrespective of the angular position of the pedal. In this way they will project light beams in the fore and aft direction regardless of the pedal orientation.

The light emitted rearwardly may be red and the light emitted forwardly and laterally may be of a different colour, such as white, so that the drivers of other vehicles will know in which direction the bicycle is travelling.

To prevent placing a foot on the pedal with the tread the wrong way round (i.e. so that red light shows forward) the pedal has a projection 15 on its underside which will alert a rider if he places his foot on it and/or the assembly 3,7 is of greater weight than the capacitor 8 so that the pedal assumes a non-horizontal attitude when there is no foot upon it. Preferably the heavier assembly 3,7 is in the rear section 11 of the pedal so that the pedal will tilt backward. When mounting the bicycle the rider will know that the pedal should be tilting backward rather than forward before placing a foot upon it. Pedals according to this embodiment will be supplied in pairs, the two pedals of each pair having oppositely-handed screw threads for engagement with the cranks so that they cannot be fitted the wrong way round.

It will be evident that both pedals of the same bicycle or other pedal driven or pedal equipped vehicle may similarly be provided with electricity generating and/or capacitor and/or LED means. It will also be evident that the electricity generated by the generator 3 might be used instead or additionally to energise some other device such as a sonic alarm.

The present invention provides for the first time a practicable way of achieving that a bicycle or the like will be provided with a lighting or other alarm or alerting system which does not rely either upon batteries or upon the rider remembering to switch it on. The system is an in-built and foolproof safety feature which could be made mandatory for bicycles without unacceptably increasing their cost or having implications for the environment such as arise from the use of batteries. A further advantage is that pedals according to the invention may be offered as replacement or "retro fit" items, so that existing machines can be equipped with them at little cost as well as new ones.

I claim:

1. A pedal for a vehicle, comprising:
   a spindle;
   a tread portion rotatable about said spindle;
   a generator mounted within the tread portion; and,
   a transmission located within said tread portion and transmitting rotation from said spindle to said generator, said generator undergoing more than one revolution for each revolution of the spindle relative to the tread portion.

2. Apparatus as claimed in claim 1, wherein the rotor of the generator is rotatably mounted within the tread portion to rotate about an axis generally parallel with that of the spindle.

3. Apparatus as claimed in claim 2, wherein the generator comprises a stator generally parallel with the spindle and stationary relative to the tread portion.

4. Apparatus as claimed in claim 3, wherein gears of the transmission means drive the rotor of the generator at one end of the generator stator.

5. Apparatus as claimed in claim 1, wherein the transmission means comprises meshing gear wheels of unequal diameter, one of which is stationary relative to the spindle and another of which drives the rotor of the generator.

6. Apparatus as claimed in claims 1, wherein the transmission means comprises pulleys of unequal diameter, one of which is stationary relative to the spindle and another of which drives the rotor of the generator, said pulleys being connected by an endless belt.

7. Apparatus as claimed in claim 5 wherein the ratio of said gear wheels is of the order of 2:1.

8. Apparatus as claimed in claim 6 wherein the ratio of said pulleys is of the order of 2:1.

9. Apparatus as claimed in claim 7, wherein the gears are included in a gear box having a 5:1 output ratio.

10. Apparatus as claimed in claim 1, wherein the generator and a gear box are arranged in longitudinal alignment within the tread portion on one side of the spindle and a capacitor is arranged within the tread portion on the opposite side of the spindle, the capacitor for storing electricity generated by the generator.

11. The pedal as claimed in claim 1, further comprising a circuit board including light emitting diodes, said circuit board mounted at a distal end of said tread portion, said light emitting diodes arranged to be illuminated by said generator.

12. The pedal as claimed in claim 11, further comprising a lens extending from and throughout a length of said distal end, said circuit board contained within said lens, wherein light from the lens emits in fore, aft and laterally from said pedal.

13. The pedal as claimed in claim 1, further comprising:
    a capacitor connected to said generator; and
    light emitting diodes connected to said generator and said capacitor, whereby in use the combination of said generator and capacitor providing sufficient voltage to constantly illuminate said light emitting diodes.

14. The pedal as claimed in claim 1, further comprising illuminating means for providing sufficient electricity to continuously illuminate the LEDs, said spindle, transmission, and said generator in combination comprising said illuminating means.

15. Electricity generating apparatus for a vehicle equipped with pedals, comprising:
    a spindle;
    a crank connected to the spindle;
    a tread portion rotatable about the spindle;
    a generator mounted within the tread portion and laterally of the spindle;
    a plurality of LEDs disposed on the tread portion and electrically connected to the generator;
    a transmission located within said tread portion and between the spindle and generator such that for each revolution of the spindle relative to the tread portion the generator undergoes more than one revolution, the generator thereby generating electricity and energizing the plurality of LEDs.

16. Apparatus as claimed in claim 15, further comprising a lens, said LEDs are mounted within said lens at one end of said pedal, said lens including mirrored surfaces arranged to project light from selected ones of said LEDs in a fore and aft direction.

17. Apparatus as claimed in claim 16, wherein said mirrored surfaces are freely rotatable within the lens and each mirrored surface is eccentrically weighted so as to tend to retain the same attitude irrespective of the angular orientation of the pedal.

18. Apparatus as claimed in claim 15, wherein the LEDs exposed to view at one side of the tread portion differ from the LEDs exposed at an opposite side of the tread portion and wherein means is provided to encourage the selection of a particular orientation of the pedal when a foot is placed upon said pedal.

19. Apparatus as claimed in claim 18, wherein the said difference is color.

20. Apparatus as claimed in claim 18, wherein the said difference is in number.

21. Apparatus as claimed in claim 18, wherein the said difference is in spatial distribution.

22. Apparatus as claimed in claim 18, wherein the weight of the tread portion differs on opposite sides of the spindle such that the tread portion adopts a non-horizontal attitude when unconstrained.

23. Apparatus as claimed in claim 18, wherein an underside of the pedal includes a projection.

24. Apparatus as claimed in claim 15, wherein the generator has an output of approximately 2 volts when relative rotation between the spindle and the tread portion is 30 rpm.

25. A pedal for a pedal-equipped vehicle, such as a bicycle, the pedal comprising:
    a spindle;
    a tread portion adapted to rotate relative to the spindle;
    electricity generating means mounted within the tread portion on one side and offset from the spindle;
    meshing gears within the tread portion arranged to drive the electricity generating means;
    a flexible transmission between the gears and the spindle; and,
    an array of light emitting diodes, the combined effect of the flexible transmission and gears being such that for each revolution of the tread portion about the spindle when the vehicle is being propelled with the aid of said pedal the rotor of the electricity generating means will be rotated so much faster that a voltage will be generated sufficient to continuously illuminate the light emitting diodes.

* * * * *

(12) EX PARTE REEXAMINATION CERTIFICATE (7312th)
United States Patent
Hicks

(10) Number: US 6,104,096 C1
(45) Certificate Issued: Jan. 12, 2010

(54) ELECTRICITY GENERATION FOR PEDALLED VEHICLES

(75) Inventor: Richard Banfield Hicks, Kingston (GB)

(73) Assignee: Pedalite International Limited, Epsom Surrey (GB)

Reexamination Request:
No. 90/010,250, Aug. 22, 2008

Reexamination Certificate for:
Patent No.: 6,104,096
Issued: Aug. 15, 2000
Appl. No.: 09/241,511
Filed: Feb. 1, 1999

(30) Foreign Application Priority Data

Feb. 2, 1998 (GB) ............................................. 9802026

(51) Int. Cl.
*H02P 9/00* (2006.01)
*B60Q 1/00* (2006.01)

(52) U.S. Cl. .............................. 290/1 R; 322/1; 180/205
(58) Field of Classification Search ........................ None
See application file for complete search history.

(56) References Cited

U.S. PATENT DOCUMENTS

| 2,185,600 A | 1/1940 | McComb |
| 2,334,442 A | 11/1943 | Salimbene |
| 2,493,491 A | 1/1950 | MacMahon |
| 2,732,541 A | 1/1956 | MacMahon |
| 2,767,391 A | 10/1956 | MacMahon |
| 3,589,193 A | 6/1971 | Thornton |
| 3,764,976 A | 10/1973 | MacMahon |
| 4,036,068 A | 7/1977 | Gilbert |
| 4,249,750 A | 2/1981 | Kantner |
| RE30,758 E | 10/1981 | Lang |
| 4,822,032 A | 4/1989 | Whitmore et al. |
| 4,946,425 A | 8/1990 | Buhlmann |
| 5,078,416 A | 1/1992 | Keyes |
| 5,634,707 A | 6/1997 | Bailey, Jr. |
| 5,662,187 A | 9/1997 | McGovern |
| 5,662,405 A | 9/1997 | Kuo |
| 5,702,172 A | 12/1997 | Kilburn |
| 5,833,348 A | 11/1998 | Bailey, Jr. |

FOREIGN PATENT DOCUMENTS

JP 7-291174 11/1995

*Primary Examiner*—My-Trang Ton

(57) ABSTRACT

A generator mounted within the tread portion of a pedal of a bicycle or the like is driven via pulleys of unequal diameter and a gear box so that the speed of rotation of the rotor of the generator is a multiple of the speed of relative rotation between the spindle of the pedal and the tread portion when the latter is held horizontal by a foot resting on it and the crank from which the spindle extends is rotated to propel the bicycle. The gearing up of the generator enables sufficient output voltage to illuminate an array of LEDs and charge a capacitor which will keep then illuminated while the pedal is temporarily stationary.

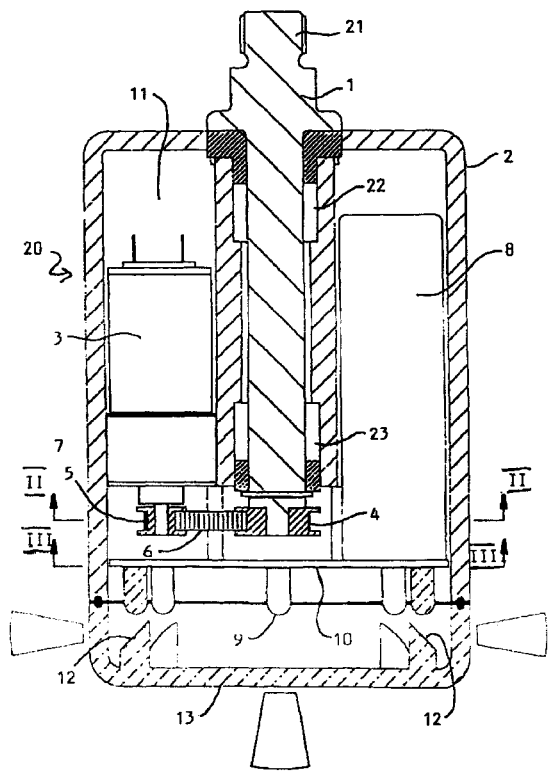

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5, 7, 9, 11, 14–15 and 18–24 is confirmed.

Claim 2 is determined to be patentable as amended.

Claim 3 and 4, dependent on an amended claim, are determined to be patentable.

Claims 6, 8, 10, 12, 13, 16, 17 and 25 were not reexamined.

2. [Apparatus as claimed in claim 1.] *A pedal for a vehicle, comprising:*

*a spindle;*

*a tread portion rotatable about said spindle;*

*a generator mounted within the tread portion; and,*

*a transmission located within said tread portion and transmitting rotation from said spindle to said generator, said generator undergoing more than one revolution for each revolution of the spindle relative to the tread portion* wherein the rotor of the generator is rotatably mounted within the tread portion to rotate about an axis generally parallel with that of the spindle.

\* \* \* \* \*